G. PETERSEN.
RESILIENT DOUBLETREE.
APPLICATION FILED MAY 19, 1915.
1,208,635.
Patented Dec. 12, 1916.
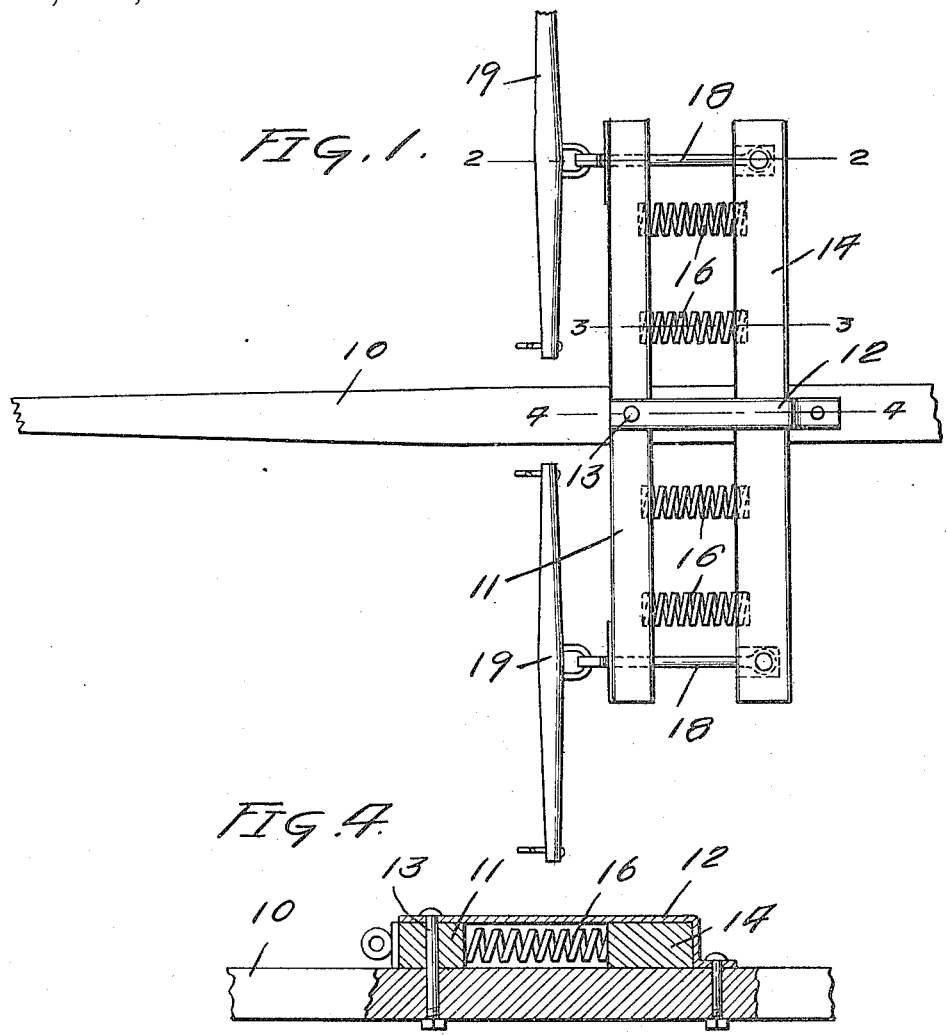
Witnesses
Inventor
G Petersen
By 
Attorneys

UNITED STATES PATENT OFFICE.

GEORGE PETERSEN, OF DENVER, COLORADO.

RESILIENT DOUBLETREE.

1,208,635.   Specification of Letters Patent.   Patented Dec. 12, 1916.

Application filed May 19, 1915.   Serial No. 29,127.

*To all whom it may concern:*

Be it known that I, GEORGE PETERSEN, a citizen of the United States, residing at Denver, in the county of Denver, State of Colorado, have invented certain new and useful Improvements in Resilient Doubletrees; and I do hereby declare the following to be a full, clear, and exact description of the invention, such as will enable others skilled in the art to which it appertains to make and use the same.

This invention relates to improvements in doubletrees for horse drawn vehicles.

The principal object of the invention is to provide a doubletree that will relieve the usual jerk to the animals when starting to pull the vehicle.

Another object is to provide a simple and cheap device of this character which can be easily applied to horse drawn vehicles now in use.

Other objects and advantages will be apparent from the following description when taken in connection with the accompanying drawing.

In the drawing: Figure 1 is a top plan view of my invention. Fig. 2 is a section on the line 2—2 of Fig. 1. Fig. 3 is a sectional view on the line 3—3 of Fig. 1. Fig. 4 is a sectional view on the line 4—4 of Fig. 1.

Referring particularly to the accompanying drawing 10 represents the tongue or pole of the vehicle, and 11 the doubletree pivotally mounted thereon. Secured to the tongue, in rear of the doubletree, is a bracket bar 12, the forward end of which is formed with a vertical opening to receive the bolt 13 which connects the doubletree to the tongue. Disposed across the tongue, in rear of, and parallel with the doubletree is a bar 14, the same passing through the space between the bracket and the tongue. In the forward face of the bar 14, and in the rear face of the doubletree, are formed sockets 15 which receive the opposite ends of the coil springs 16. Pivotally connected to the ends of the bar 14, and extending forwardly through openings 17 in the ends of the doubletree, are links 18, the forward ends of which are connected to the swingle trees 19. It will thus be seen that when the draft animals start to pull the vehicle, there will not be the usual jerk, as with the rigidly mounted doubletrees of common use, but a yielding action tending to relieve the animals of jar, and obviating injury to the animals' shoulders.

What is claimed is:

A draft device for a horse drawn vehicle comprising a pole, a doubletree bar pivotally mounted thereon, a bracket secured to the pole and connected to the pivot of the doubletree, said doubletree bar having openings extending forwardly and rearwardly through the ends thereof, and sockets in the rear face thereof, a second transverse bar disposed on the pole rearwardly of the doubletree and under the bracket, said second bar having sockets in its forward face, coil springs between the bars and having their ends seated in the sockets of both bars, and links pivotally connected to the ends of the second bar and extending through the end openings of the doubletree, said links fitting loosely in said openings.

In testimony whereof, I affix my signature, in the presence of two witnesses.

GEORGE PETERSEN.

Witnesses:
HARRY PETERSEN,
GUSTAVE PETERSEN.

Copies of this patent may be obtained for five cents each, by addressing the "Commissioner of Patents, Washington, D. C."